United States Patent
Bennett

(10) Patent No.: US 6,796,076 B1
(45) Date of Patent: Sep. 28, 2004

(54) FLOAT SUPPORTED FISHING APPARATUS WITH AUTOMATIC HOOK SET

(76) Inventor: Brian J. Bennett, 6193 Daybreak Dr., Bartlett, TN (US) 38135

( * ) Notice: Subject to any disclaimer, the term of this patent is extended or adjusted under 35 U.S.C. 154(b) by 0 days.

(21) Appl. No.: 10/302,005

(22) Filed: Nov. 22, 2002

Related U.S. Application Data

(63) Continuation-in-part of application No. 09/977,427, filed on Oct. 15, 2001.

(51) Int. Cl.$^7$ .......................... A01K 93/00; A01K 97/12
(52) U.S. Cl. ...................... 43/16; 43/43.15; 43/43.11; 43/44.92
(58) Field of Search ............................ 43/43.11, 43.15, 43/44.88, 44.92, 16; 242/612

(56) References Cited

U.S. PATENT DOCUMENTS

| | | | | |
|---|---|---|---|---|
| 2,728,161 A | * | 12/1955 | Mangel | 43/43.11 |
| 3,010,238 A | * | 11/1961 | Crumrine | 43/16 |
| 3,464,141 A | * | 9/1969 | Amlin | 43/43.11 |
| 4,103,379 A | * | 8/1978 | Wolfe | 441/11 |
| 4,571,878 A | * | 2/1986 | Nyman | 43/43.11 |
| 4,672,769 A | * | 6/1987 | Thompson | 43/43.11 |
| 4,825,580 A | * | 5/1989 | Gray | 43/44.9 |
| 5,265,369 A | * | 11/1993 | Botkins | 43/43.11 |

* cited by examiner

*Primary Examiner*—Kurt Rowan
(74) *Attorney, Agent, or Firm*—Watt, Tarrant & Combs, L.L.P.

(57) ABSTRACT

A free floating fishing apparatus includes a float and a spool that is positioned on the float for holding a supply of line to be dispensed. A line holding beam is mounted on the float and has a line guide that enables fishing line to be spooled from the spool through the line guide and then underwater for fishing. Rigging such as a hook, sinker or the like can be attached to the free end portion of a line. The spool is comprised of two sections, a non-rotating section which is received over the float and a rotating section received over the non-rotating section. A finite length of line is wound on the rotating section and a selected amount is payed out prior to fishing. The free end of the payed out line is attached to a hook and perhaps a float and the float and hook are dropped into the water. Depending upon the amount of line wound and whether the spool sections are locked during fishing, a finite amount of line may pay our after the fish has struck the hook.

11 Claims, 7 Drawing Sheets

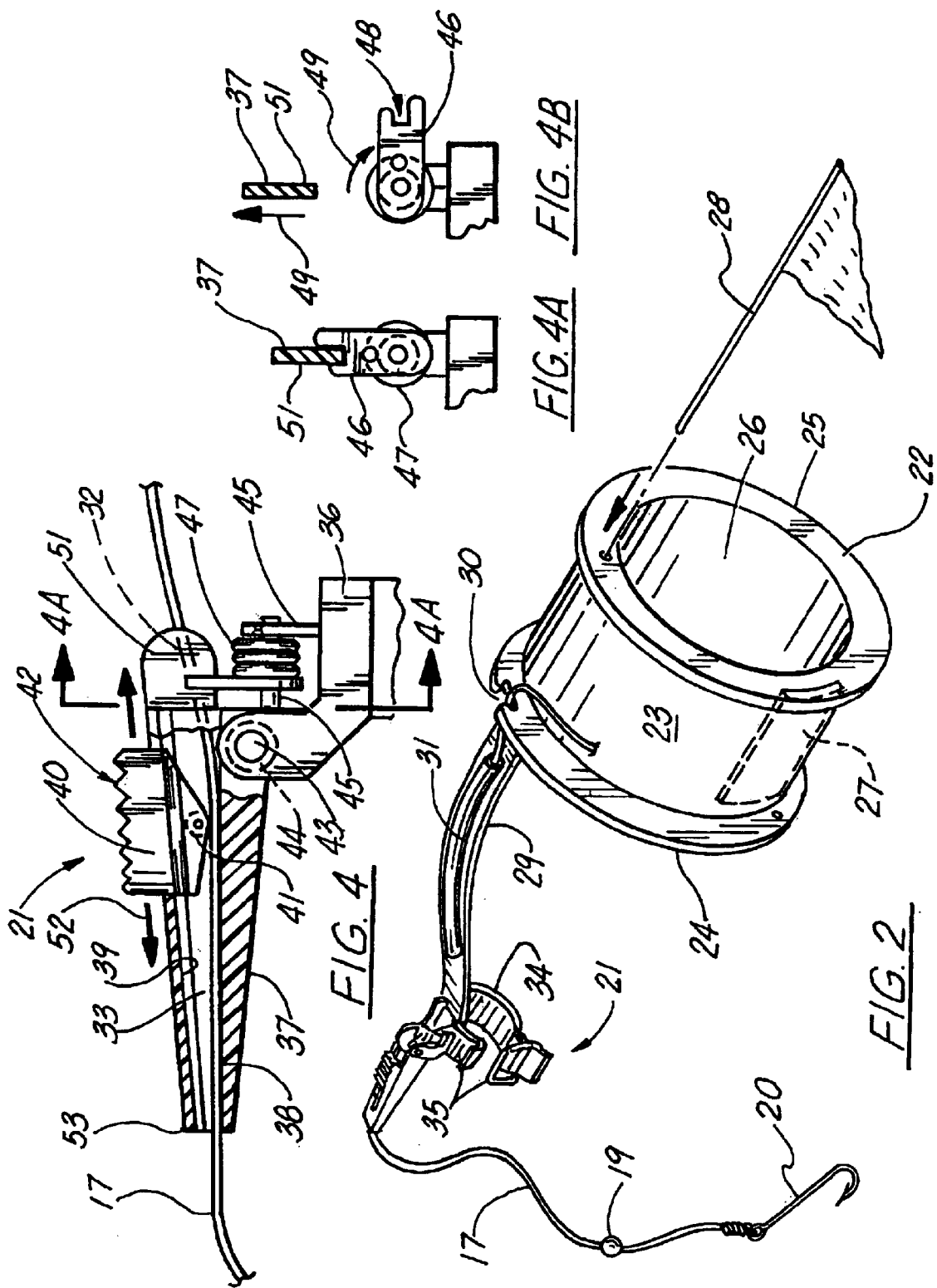

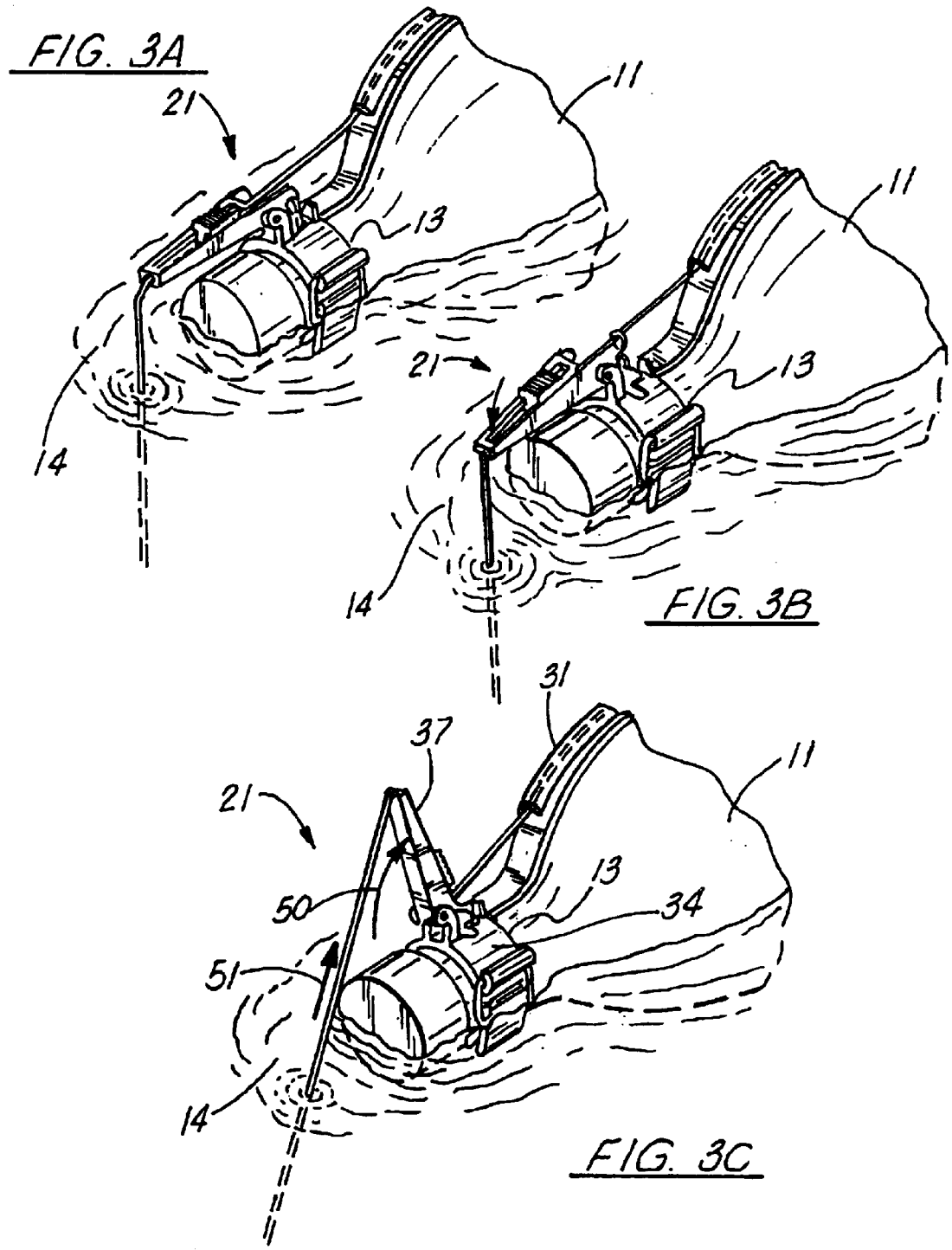

FLOAT SUPPORTED FISHING APPARATUS WITH AUTOMATIC HOOK SET

CROSS-REFERENCE TO RELATED APPLICATIONS

This is a continuation-in-part of co-pending U.S. patent application Ser. No. 09/977,427, filed Oct. 15, 2001, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a fishing apparatus that employs a large float having rigging thereon that automatically sets the hook if the rigging is successful in attracting a fish. Even more particularly, the present invention relates to an improved fishing apparatus that features a float that can be in the form of a disposable plastic drink bottle (for example, an empty two liter bottle) having an attached automatic hook setting device.

2. General Background of the Invention

Many prior art patents have issued that are related to free floating fish catching devices. Other devices are known that have automatic hook set mechanisms.

An example of a free floating fish catching device is disclosed in the Johnson U.S. Pat. No. 3,216,146 entitled "Free Floating Fish Float". The '146 patent discloses the use of a float that has a recess portion for spooling line thereon that is to be stored. A length of fishing line extends from the float downwardly, carrying rigging such as a sinker and hook.

A hook setter is the subject of U.S. Pat. No. 3,559,326 issued to Henderson. The '326 patent discloses a device that comprises a length of wire forming two elongated legs joined by a spring loop to provide spring tension to the legs. The end of one leg has a first loop and a transverse finger thereon and the other leg has a latch arm pivoted at its center to the end and a downwardly extending finger on the other end. The first leg has means thereon for storing fishing line and a portion of the line extends through both loops on the legs and is provided with a hook at its free end. When the legs are brought together, the fingers are engaged to set the device, and when a fish bites, the fingers are disengaged and the legs spring apart to set the hook in the fish's mouth.

The Van Orden et al. U.S. Pat. No. 4,199,889 discloses a float to be used with fishing line to support the bait at any desired depth below the surface of the water. When the fisherman swings his rod to cast the bait and float, they are close together for casting, but the float is constructed to permit the bait to move downward to a predetermined depth after the float strikes the water. When a fish is caught, the bait and fish are brought close to the float during the first part of the reeling-in of the line, so that the fish can be netted, if desired.

The Zehner U.S. Pat. No. 4,043,069 discloses a fish hook setting device which is formed into a safety pin configuration from an elongated segment of tempered wire. The triggering mechanism is configured from a second tempered wire having a helical coil lever arm to provide a sensitivity adjustment. The second embodiment includes an adjustable line drag mechanism for supporting one end of the fishing line.

The Brachear U.S. Pat. No. 4,607,449 discloses a fishing jug that includes a hollow floatable housing with a generally cylindrically side wall and top and bottom end walls. A hollow, inverted U-shaped handle with a removable seal plug is connected to the top end wall in communication with the interior of the housing. There is a reduced-diameter neck in the lower portion of the side wall having an external, toroidal surface of concave, parti-circular cross-section extending completely around the housing. There is a downwardly enlarged, flared lower ballast compartment between the neck and lower end wall. One or more hook-engageable loops are outstanding from the neck but are entirely recessed within a cylindrical projection of the side wall. The loops are offset from a minimum diameter section of the neck.

The Neihoff et al. U.S. Pat. No. 4,884,355 discloses a fishing float in the form of a container or jug that includes a visual signal selectively actuated upon the taking of a baited hook on a line by a fish. The device contains a power source and circuitry including an electrically conductive plunger operable by fishing line movement.

In the Walker U.S. Pat. No. 6,092,325, there is disclosed a fishing jug including an elongated container with a larger, closed end and a smaller, open end. The closed end of the container includes an integrally formed U-shaped handle to facilitate retrieval of th fishing jug when fishing is completed. The open end of the container is threaded. The fishing jug also includes a reversible, double-ended lid which is matingly threaded in each end, and thus is removably attached to the open end of the container. The lid prevents water from entering the container when the fishing jug is in use. The reversible lid includes a central portion having two sides with a fishing loop connected to each side. The container also includes a recessed portion to accommodate application of a label to identify the fisherman using the fishing jug.

U.S. Pat. No. 5,048,219 discloses a free floating fish catching device having a large dimension, generally flat float structure having upper and lower surfaces. A connector projection extends upwardly from the central portion of the top surface and defines an aperture to receive one end of a swivel to which a fishing leader and hook are connected. The fish catching device is inverted by a biting fish to expose an attention attracting surface to provide an indication that a fish has been caught. A lifting loop is also provided to enable the device to be lifted from the water along with the fish. The inverted top surface of the device functions as a water brake to retard movement of the device by the fish and functions together with the leader connector element to cause a caught fish to swim in a circle rather than swimming away with the device.

The Bartok et al. U.S. Pat. No. 5,207,013 discloses a free floating fishing apparatus in which a fisherman can toss the apparatus out of a boat when he leaves an area so that there is no disturbance in the area of the apparatus to keep the fish from being attached to the bait attached to the hook. The apparatus consists of a container which may be hollow, filled with air and of sufficient size to float on the water, to provide enough resistance to set the hook in the mouth of the fish and to provide enough drag to tire the fish after the hook has been set in the mouth of the fish. Attached to a smaller end of the container is a lid to prevent water from entering the container. Also attached to the smaller end is a fishing line to which is attached a swivel, a sinker, and a hook to which bait may be attached.

In U.S. Pat. No. 5,819,465 there is disclosed a "hook setting fishing buoy" having a container with an inner compartment, a spring secured within the compartment and movable between a tensioned position and an untensioned position, a line operatively connected to the spring so that the spring may provide a hook setting force to the line when the spring moves from the tensioned position to the untensioned position and a catch connected at the buoy is released to retain the spring in a tensioned position until a force is applied to the line.

3. General Discussion of the Present Invention

The present invention provides an improved free floating fishing apparatus that includes a slip on frame that can be used in combination with a float. The float can, for example, be an empty plastic (e.g. 2 liter) drink bottle.

The apparatus features a hook setting device that is carried by the frame. The frame includes a plastic spool with an inside diameter large enough to slip over the float. The float is of a size, shape and buoyancy for fishing when either small or large fish are to be caught. For example, a two liter bottle is a size that can be used for many varieties of fish, and for fish that are both small and large.

The spool is fitted over the bottle and is positioned about midway between first and second end portions of the float. One float end portion can provide a narrowed neck to be fitted with a collar that is part of the hook setting device of the apparatus. The spool is preferably used to store fishing line that is not being used. The spool can be secured to the bottle by means of the collar and an arm that extends from the neck of the bottle to the mid portion of the bottle. A collar that supports a small fishing rod or arm is clamped to the neck of the bottle. A tongue and groove type lock mechanism can be used to secure the collar to the neck portion of the float.

A hook setting device that includes the small rod or arm can be mounted on the collar that is clamped to the neck of the float or bottle. The hook setting device preferably comprises the arm which is movable between extended and retracted positions. The arm occupies the retracted position until it is cocked forward. Tension is applied to the arm using a coil spring. The arm is then held in place by a catch or sear that is released when the fish pulls on the rigging (e.g. line, sinker, hook) that is attached to the arm. When this occurs, the arm swiftly moves from the extended to the retracted position, thereby setting the hook.

Prior art that is known to applicant and that is not disclosed in the above discussion includes simply the concept of using a disposable bottle in combination with a length of fishing line with a sinker and a baited hook. Fishing with such a common appliance is known by the slang term "jug fishing" and is practiced routinely all over the country.

The present invention thus provides an inexpensive apparatus that can be utilized in combination with a float or an empty disposable bottle.

The apparatus features a spool that holds unused line. A fisherman can thus put as much spare line on the spool as desired. When it is desired to use the apparatus for fishing, the fisherman pulls a desired length of line from the spool and routes the line through line guides that are provided on the apparatus. This spool apparatus solves a problem of line storage and tangling.

A weight is molded into the bottom of the spool so that the float or bottle will assume the proper orientation. This orientation places the moving arm that sets the hook in an uppermost position above the water surface.

The spool can provide an opening to which a wire rod with plastic flourescent flag can be inserted to extend beyond the upper end portion of the float or bottle. Such a flag assists a fisherman in detecting the presence of a fish in low light or windy conditions.

When a fisherman is ready to use the apparatus, the desired amount of line is unwound from the spool and then threaded through the multiple line guides. The line is then inserted into the hook setting arm and made secure by pushing an adjustable stop to hold the line secure.

Rigging such as a weight and hook are attached to the lower end portion of the line that extends below the float during use. The arm is then cocked to an intermediate position that is in between a fully extended position and the retracted position. Tension is supplied by a coil spring for biasing the arm to move towards the retracted position. However, the arm is held in the intermediate position by a catch or sear that only releases upon receiving a bite that pulls on the line. When a fish bites the hook, tension transmitted to the line pulls the arm beyond the intermediate position to the fully extended position. When this occurs, the sear or catch is released and the arm then snaps back into the original retracted position jerking the hook approximately a few inches, thus setting the hook. A strike can be detected by an audible click of the arm or noting the position of the arm as being in the retracted position.

The present invention thus provides an improved, free floating fishing apparatus that includes a float and a spool that is positioned on the float for holding a supply of line to be dispensed. A trigger assembly is mounted on the float. The trigger assembly includes line guides that enable fishing line to be spooled from the spool, through the line guides and then underwater for fishing with a hook that can be attached to a free end portion of the line.

The trigger assembly includes an arm that is pivotally movable between fully extended and fully retracted positions. The arm is spring loaded to bias the arm toward the retracted position.

A catch or sear enables the arm to be retained in an intermediate position that is in between the extended and retracted positions, but closer to the extended position. The sear or catch is also spring loaded to move the sear out of engagement with the arm when the arm is moved beyond the intermediate position toward the extended position, such as when a fish strikes the line.

The arm has a line support that holds the line so that when the arm travels under spring tension toward the retracted position, the line is pulled a few inches very quickly thus setting the hook.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is another perspective view of the preferred embodiment of the apparatus of the present invention showing the spool, collar and support beam separated from the float;

FIGS. 3A–3B are fragmentary views of the preferred embodiment of the apparatus of the present invention;

FIG. 3C is a fragmentary view of the preferred embodiment of the apparatus of the present invention showing the arm in a fully retracted position;

FIG. 4 is a fragmentary side view of the arm portion of the preferred embodiment of the apparatus of the present invention;

FIG. 4A is a fragmentary view illustrating the catch or sear with arm in the intermediate position;

FIG. 4B is a fragmentary view illustrating the catch or sear after it has been sprung such as when a fish bites the line;

DETAILED DESCRIPTION OF THE INVENTION

Figure 1:
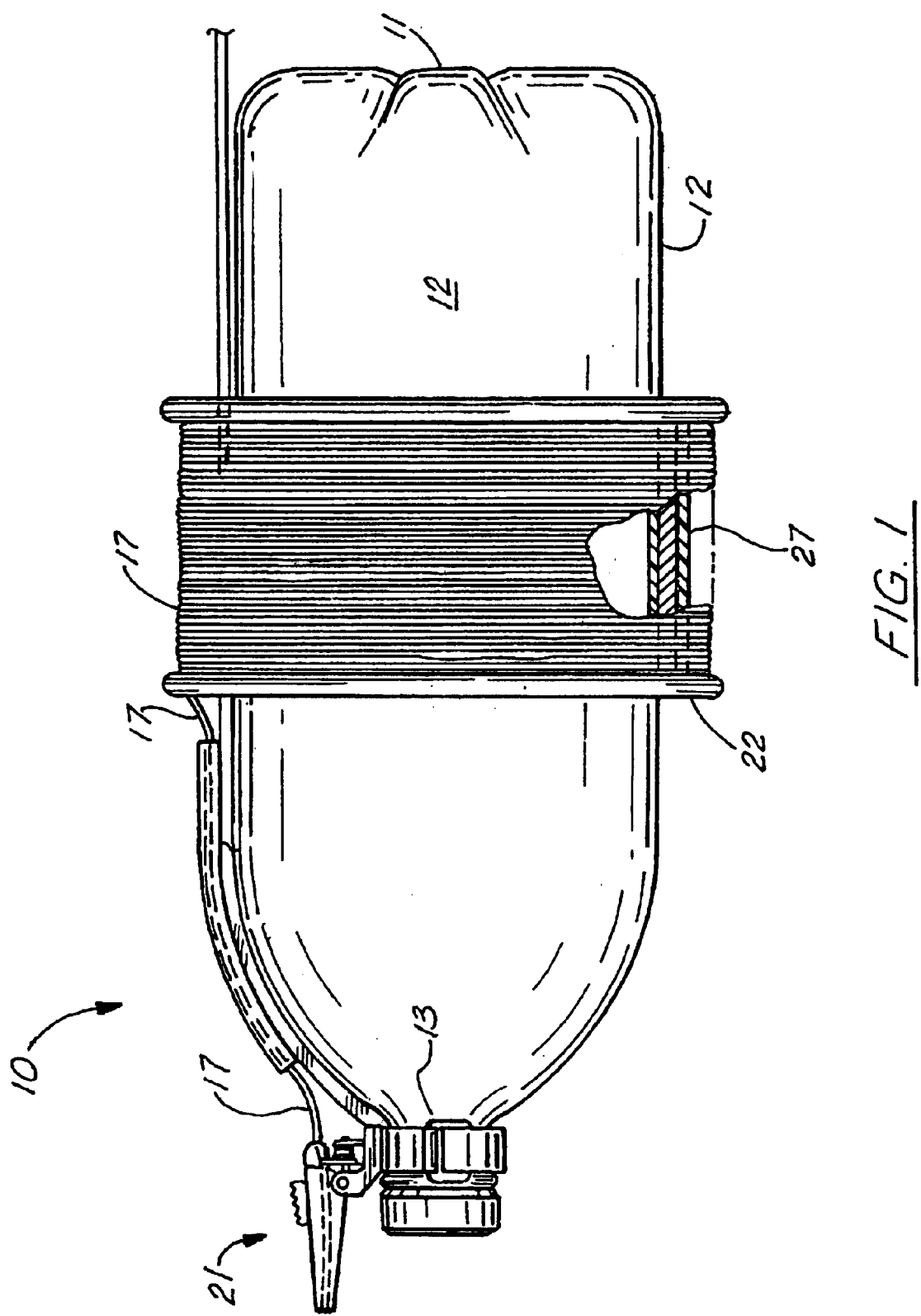
FIG. 1 is a perspective view of the preferred embodiment of the apparatus of the present invention.
Figure 5:
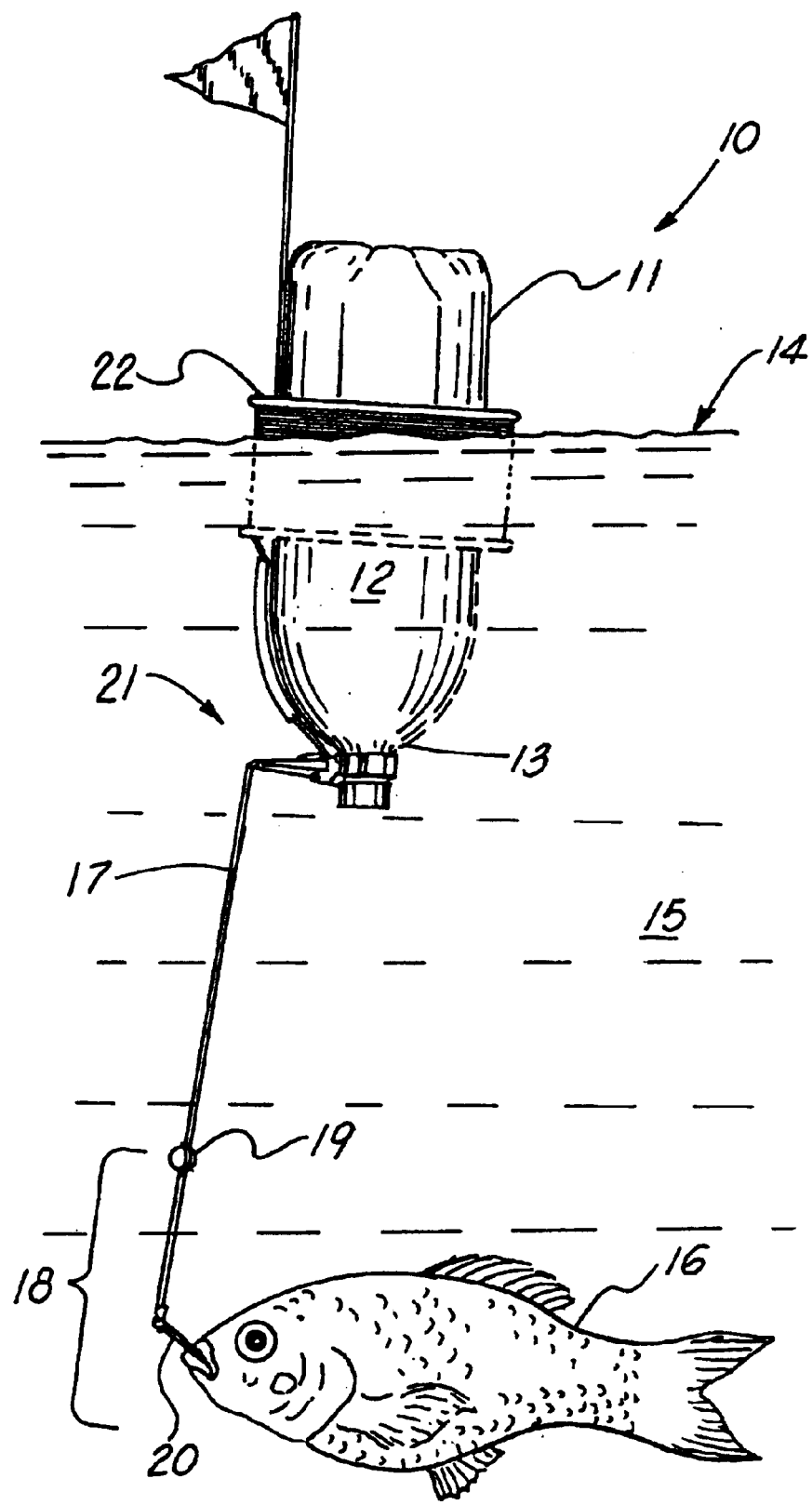
FIG. 5 is a perspective view of the preferred embodiment of the apparatus of the present invention.

FIGS. 1 and 5 show generally the preferred embodiment of the apparatus of the present invention designated generally by the numeral 10. Fishing apparatus 10 includes a float 11 having a body 12 and neck portion 13. In FIG. 5, the float 11 is shown floating on a water surface 14. Also shown is a marine environment 15 that includes a fish 16 to be caught. During use, a length of fishing line 17 extends from the float 11 downwardly into the marine environment 15. The rigging 18 can include, for example, a portion of line 17, a sinker 19 and hook 20 to be baited.

A trigger assembly 21 is provided for setting the hook 20 when a fish 16 grabs bait that is attached to the hook 20. The trigger assembly is shown in more detail in FIGS. 3A–3C and 4. A spool 22 is provided that is connected to the collar 34 part of the trigger assembly 21 with beam 29 as shown in FIG. 2. The spool 22 can provide a curved wall 23 and a pair of spaced apart annular flanges 24, 25, as shown in FIG. 2. This enables a large amount of fishing line 17 to be wound upon the curved wall 23 of spool 22 and in between the annular flanges 24, 25.

Spool 22 provides a large cylindrically shaped opening 26 that can be occupied by float 11. In the preferred embodiment, the float 11 can be a common disposable plastic bottle such as a two liter drink bottle. However, other floats could be attached to spool 22 at opening 26.

Spool 22 provides a weight 27 that is positioned generally opposite trigger mechanism 21 as shown in FIG. 1. In this fashion, the trigger mechanism 21 will be supported above the water surface 14 as shown in FIGS. 3A–3C. The water will thus not adversely affect the quick movement of the arm 37 portion of the trigger assembly 21 during use. Spool 22 can also be provided with signal flag 28 that can be attached to a provided opening in spool 22 or are otherwise attached thereto. The signal flag 28 can be of a flourescent orange or other bright color and of the type having a wire staff and utilized to mark locating pins or sprinkler heads during construction.

The apparatus 10 provides a plurality of line guides 30–33 as shown in FIGS. 2 and 4 including line guide 30 on flange 24, line guide 31 on support beam 29, line guide 32 at the inner most end portion of arm 37, and an elongated line guide 33 that extends the full length of arm 37, as shown in FIG. 4.

Collar 34 can be attached to neck 13 of float 11 using clasp 35 as shown in FIG. 2. The clasp 35 can be any suitable closure that will closely conform the collar 34 to the bottle neck 13 as shown in FIGS. 1, 2, and 3A–3C. Arm 37 provides a pair of internal, angularly oriented surfaces 38, 39. The surface 39 forms an acute angle with line 38 that is fed through guide 33. The surface 38 is a surface that line 17 fits closely against and conforms to, as shown in FIG. 4. Line tensioner 41 can be moved in the direction of arrow 52 for applying more or less tension to line 17. For example, the line tensioner 40 can be moved in the direction of arrow 52 a distance so that line 17 is anchored to arm 37 and does not slide at all with respect to arm 37 during use. The line tensioner 40 can include a gripping surface 42 for receipt of a user's finger and a roller 41 that actually engages line 17.

Arm 37 is pivotally attached to collar 34 at pivot 43. Coil spring 44 biases arm 37 to move to a fully retracted position such as is shown in FIG. 3C. After a fisherman initially baits the apparatus 10 by applying bait to hook 20, the arm 37 is moved to a cocked, intermediate position as shown in FIGS. 3A, 3B, 4 and 4A. In this position, the coil spring 44 cannot move the arm 37 because trigger sear or catch 46 holds arm 37 as shown in FIGS. 4 and 4A.

A beam or other structure 36 can be used to form an interface between collar 34 and arm 37 as well as sear 46. A support 45 extends from beam 36 for supporting the sear plate 46. The sear plate 46 can provide a recess 48 that is sized and shaped to receive the innermost end portion 51 of arm 37. The sear plate 46 has a coil spring 47 that causes it to rotate away from beam 37 in the direction of arrow 49 when a fish 16 strikes the hook 20. When a fish 16 does strike the hook 20, the arm 37 is moved from an intermediate cocked position as shown in FIG. 4 to a fully extended position that disengages arm 37 with sear plate 46. This initial action of the fish 16 striking the hook 20 thus releases the sear plate 46 from the arm 37 and enabling coil spring 44 to quickly move the arm 37 from an extended to a retracted position. The retracted position is shown in FIG. 3C. Arrow 50 in FIG. 3C shows the rapid movement of arm 37 from the extended to the retracted position. Such quick movement sets the hook to hopefully ensure the catch.

FIGS. 6, 7A–7D and 8A–8D show alternative embodiments of the apparatus of the present invention including a fishing spool designated generally by the numeral 60. Fishing spool 60 includes two parts that are assembled together and then mounted to a float, preferably the bottle type float 12 of FIG. 1. The spool 60 includes a stationary section 61 that is mounted to the bottle 12 and a rotating section 62 that carries a length of fishing line for use in fishing.

Figure 6:
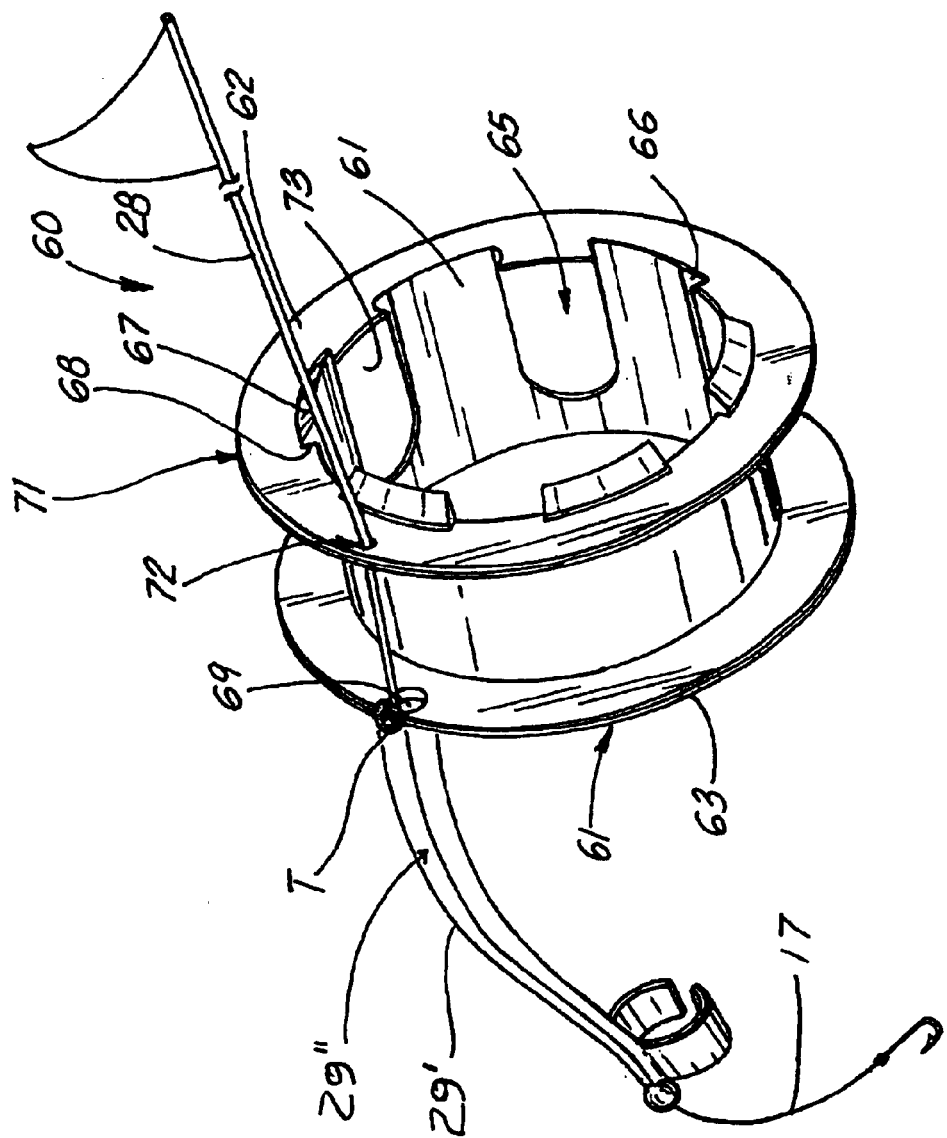
FIG. 6 is a perspective view of an alternate embodiment of the apparatus of the present invention.
Figure 7B:
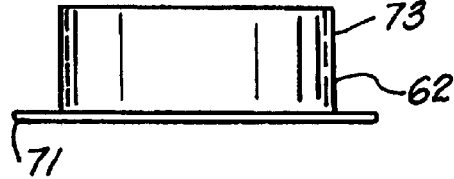
FIG. 7B is a side view of the rotating spool portion of FIG. 7A.
Figure 7A:
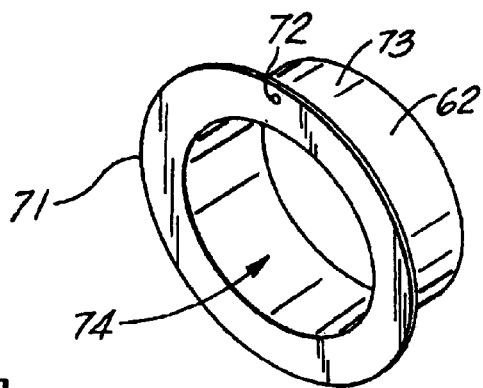
FIG. 7A is a partial, perspective view of the alternate embodiment of the apparatus of the present invention illustrating the rotating spool portion.
Figure 7C:
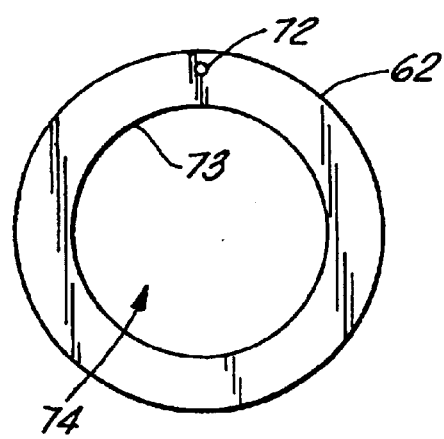
FIG. 7C is a top view of the rotating spool of FIG. 7A.
Figure 7D:
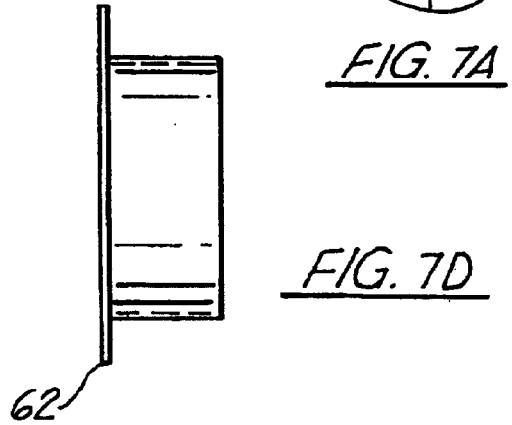
FIG. 7D is a side view of the rotating spool of FIG. 7A.
Figure 8B:
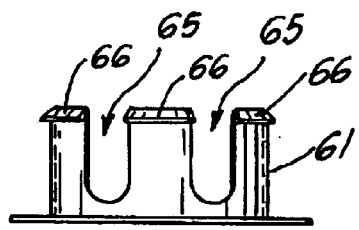
FIG. 8B is a side view of the non-rotating spool portion of FIG. 8A.
Figure 8A:
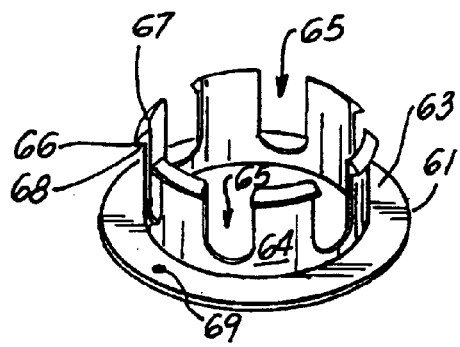
FIG. 8A is a partial perspective view of the preferred embodiment of the apparatus of the present invention illustrating the non-rotating spool portion thereof.
Figure 8C:
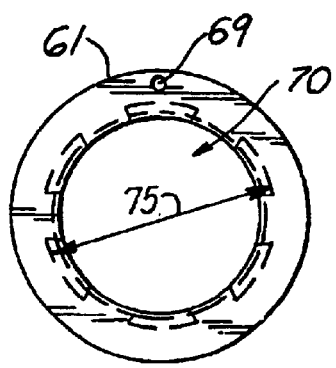
FIG. 8C is a bottom view of the non-rotating spool portion of FIG. 8A.
Figure 8D:
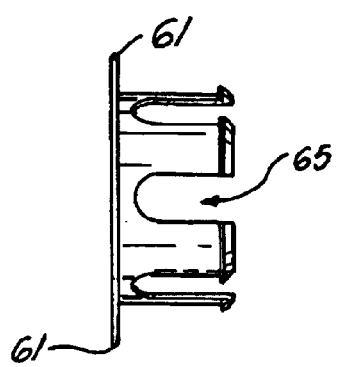
FIG. 8D is another side view of the non-rotating spool portion of FIG. 8A.
Figure 9:
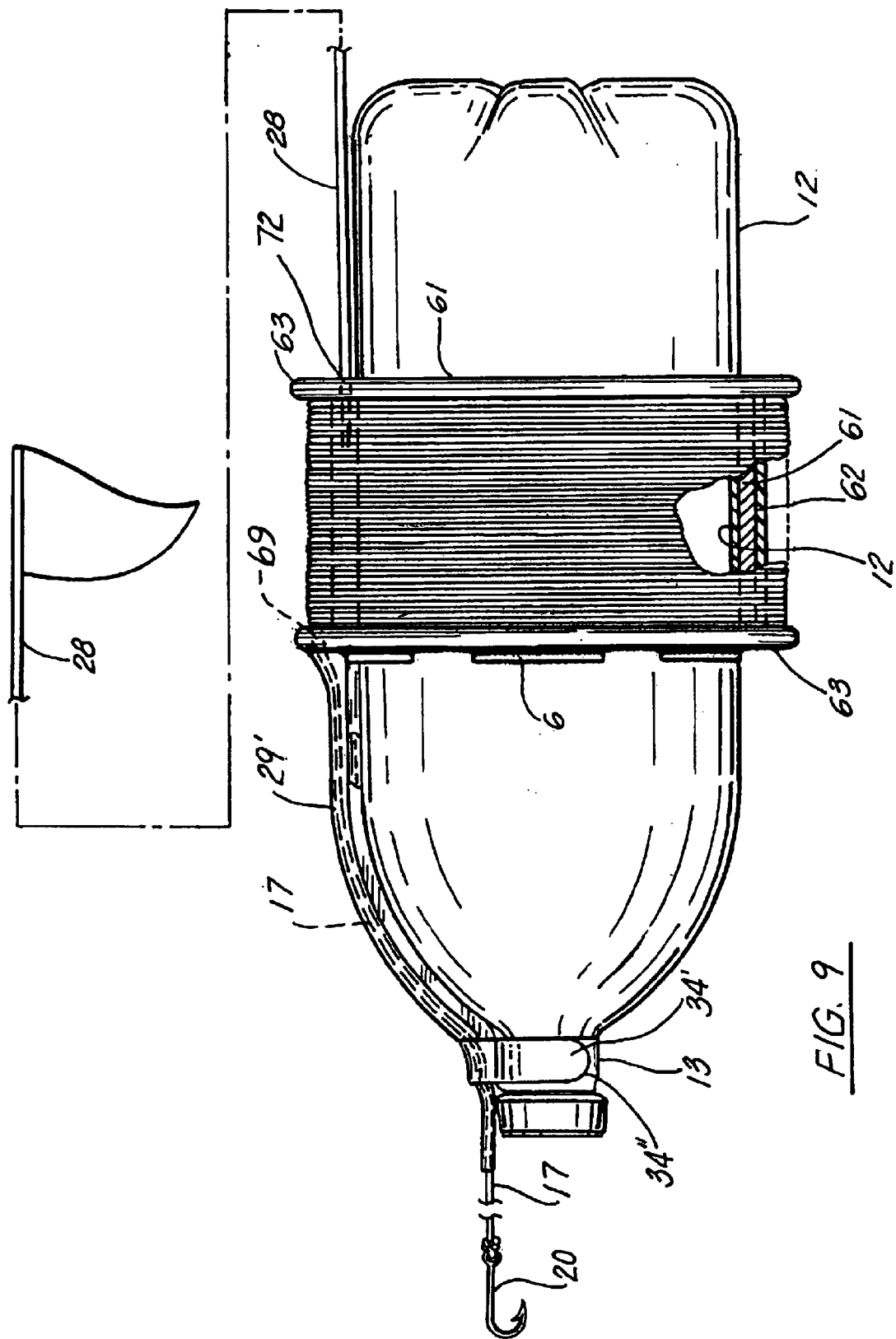

The stationary section 61 includes an annular flange 63 and a generally cylindrically shaped wall 64. In the illustrated embodiment, the wall 64 is provided with a plurality of cut outs or slots 65 such as the six slots or cut outs 65 shown in FIG. 8A. The cut outs may take other shapes with their functional purpose of providing resilience in the remaining sections of wall 64. The wall 64 provides a plurality of tabbed retainers 66 that hold rotating portion 62 in position as shown in FIG. 6. In the illustrated embodiment, each of the tabbed retainers 66 includes a beveled surface 67 and a radially extending surface 68. The non-rotating section 61 has a exit opening 69 through which line pays out during fishing operations (see FIG. 9). The rotating section 62 has a line anchoring opening 72 on annular flange 71 for securing the end of the line 17 to the section 62 prior to winding on the desired length.

The rotating section 62 includes flange 71, cylindrically shaped wall 73, and has an open center 74. The wall 73 is of a diameter that is slightly greater than the diameter of wall 64 but less than the diameter 75 of the non-rotating section at the tabbed retainers 65. The combination of walls 64 and cut outs 65 enable the walls 64 to flex when the rotating spool section 62 is added to the non-rotating section 61. However, the tabbed retainers 66 prevent inadvertent removal of the rotating section 62 once assembled to the non-rotating section as shown in FIG. 6.

The non-rotating section 61 has an open center 74 that is sized and shaped to closely fit the outer surface of the float 12. Preferably, a frictional or interference fit is formed between the non-rotating or stationary section 61 and the float 12. One of the alternative embodiments includes a line support beam 29' attached to section 62, analogous to the line support beam 29 however, providing a channel 29" (FIG. 9) internally of beam 29' through which line 17 may traverse the distance from section 62 to the payout end adjacent collar 34. In th alternative, channel 29" maybe replaced with spaced eyelets or similar retainers, along the extent of beam 29' to hold line 17 thereon. By means of beam 29', line 17 may be kept from tangling with neck portion 13 and float 12 such that hook 20 is suspended freely below the float when suspended in water. In the embodiment illustrated in FIG. 9, beam 29' terminates in a simple collar 34' including facing C members 34" to engage the neck of the bottle forming float 11. This collar embodiment is distinguished from the embodiment illustrated in FIGS. 1 through 5 in that a clasp 35 is not included.

During use, a fisherman selects a length of line suitable for fishing a particular spot, such as for example 10–15 feet, and attaches a first free end of the line to the anchoring opening 72 of the rotating spool section 62. The line is then wound upon the rotating section 62, with a second free end portion of the line being fed through the exit opening 69 of non-rotating spool section 61. A hook 20 is then rigged to the second free end of the line. Thus, when the fish bites a hook that is attached to the second free end portion of the line that extends through opening 69, the fish can run a short distance, namely the length of the line that is wound upon the spool rotating section 62 before the anchored end (first end) of the line attached to opening 72 prevents further travel by the fish. However, this paying out of the line over a short period of time enhances the chance that the fish will fully swallow the hook and be caught.

Alternatively, a larger amount of line, such as 50 yards or so, may be wound on the rotating section 62, and the desired length of line 17 may be drawn from the rotating section 62 and the spool 60 effectively locked by inserting the signal flag 28 staff through the respective line anchoring opening 72 and exit opening 69 (FIG. 6), being secured at the exit opening by a nominal twist T of the wire staff 28 at 69. Accordingly, the spool is locked and no further line pays out when a fish takes the hook 20 and runs with it, pulling the float as the fish swims. Those skilled in the are will recognize that other means may be used to secure sections 61 and 62, also as by a twist of wire, a clip, screw or and equivalent fastening device, or the like.

The following is a list of suitable parts and materials for the various elements of the preferred embodiment of the present invention.

PARTS LIST

| PART NO. | DESCRIPTION |
|---|---|
| 10 | fishing apparatus |
| 11 | float |
| 12 | body |
| 13 | neck portion |
| 14 | water's surface |
| 15 | marine environment |
| 16 | fish |
| 17 | length of fishing line |
| 18 | rigging |
| 19 | sinker |
| 20 | hook |
| 21 | trigger assembly |
| 22 | spool |
| 23 | curved wall |
| 24 | annular flange |
| 25 | annular flange |
| 26 | cylindrical opening |
| 27 | weight |
| 28 | signal flag |
| 28' | flag staff |
| 29 | support beam |
| 29' | support beam |
| 30 | line guide |
| 32 | line guide |
| 33 | line guide |
| 34 | collar |
| 34' | collar |
| 34" | C member |
| 35 | clasp |
| 36 | beam |
| 37 | arm |
| 38 | surface |
| 39 | surface |
| 40 | line tensioner |
| 41 | roller |
| 42 | gripping surface |
| 43 | pivot |
| 44 | coil spring |
| 45 | support |
| 46 | sear plate |
| 47 | coil spring |
| 48 | recess |
| 49 | arrow |
| 50 | arrow |
| 51 | inner end portion |
| 52 | arrow |
| 53 | outer end portion |
| 60 | spool |
| 61 | stationary section |
| 62 | rotating section |
| 63 | annular flange |
| 64 | wall |
| 65 | slot |
| 66 | tabbed retainer |
| 67 | beveled surface |
| 68 | radially extending surface |
| 69 | exit opening |
| 70 | open center |
| 71 | annular flange |
| 72 | anchoring opening |
| 73 | cylindrical wall |
| 74 | open center |
| 75 | diameter arrow |

The foregoing embodiments are presented by way of example only; the scope of the present invention is to be limited only by the following claims.

What is claimed is:

1. A fishing apparatus comprising:
   a) a cylindrical float;
   b) a spool positioned on the float for holding a supply of line to be dispensed;
   c) a line guide beam, having an attached end and a free end, attached to the spool at its attached end and that enables fishing line to be spooled from the spool, through the guide to its free end and then underwater for fishing with a hook that can be attached to a free end of the line;
   d) the spool being comprised of a cooperating stationary section and a rotating section, the stationary section having a cylindrical wall having a first end and a second end closely received over the cylindrical float, with a radially extending flange at a first end of the wall, and the rotating section having a cylindrical wall having a first end and a second end, closely overlapping and rotatably received over the cylindrical wall of the stationary section, with a radially extending flange at a first end of the rotating section wall generally opposite the radial flange of the stationary section;
   e) retaining means on the second end of the cylindrical wall of the stationary section, the retaining means extending radially of the cylindrical wall of the stationary section a distance to extend beyond the radial extent of the cylindrical wall of the rotating section; and
   f) the line guide beam free end extending axially beyond the float so that the free end of the line falls displaced from the float to permit the line to be pulled for setting the hook when fishing.

2. The fishing apparatus of claim 1 wherein the float is a bottle having a neck.

3. The fishing apparatus of claim 1 wherein the stationary section has retainers that hold the rotating section on the stationary section.

4. The fishing apparatus of claim 3 wherein the retainers include a plurality of tabbed portions disposed peripherally at the second end of the cylindrical wall, opposite the flanged portion.

5. The fishing apparatus of claim 4 wherein the stationary section cylindrical wall includes a plurality of slots extending axially intermediate the tabbed portions toward the cylindrical wall flanged end.

6. The fishing apparatus of claim 2 wherein the line guide has a collar adjacent its free end and is attached at the bottle neck by the collar.

7. The fishing apparatus of claim 6 wherein the line guide includes a channel from the spool to the line guide free end in which free line is disposed.

8. The fishing apparatus of claim 6 wherein the line guide has a plurality of eyelets disposed over its length for retaining the line.

9. The fishing apparatus of claim 1 wherein said spool is weighted to orient the float in a selected orientation.

10. Fishing apparatus of claim 9 wherein the line is anchored to the rotating section and includes a predetermined amount of line wound thereon, whereby tension applied to the line by a fish that bites the hook and pulls out the wound line to its end enables the hook to be stopped suddenly to set the hook in the fish.

11. A fishing apparatus comprising:
    a) a float that has a generally cylindrically shaped bottle having a neck;
    b) a spool positioned concentrically on the cylindrically shaped float for holding a supply of line to be dispensed;
    c) the spool including a stationary inner section and a rotating outer section mounted on the float, the stationary section having a line guide that enables fishing line to be spooled from the spool, through the guide and then underwater for fishing with a hook that can be attached to a free end of the line;
    d) the stationary inner section has retainers having tabbed portions that hold the rotating section upon the stationary section; and
    e) the stationary inner section is sized and shaped to receive the bottle in a frictional engagement whereby the rotating line containing section enables fishing line to be wound thereon and paid out for fishing with a hook.

* * * * *